United States Patent
Lee et al.

(10) Patent No.: US 6,319,975 B1
(45) Date of Patent: Nov. 20, 2001

(54) COMPOSITION FOR AIR PERMEABLE FILM OF HIGH PROCESSABILITY AND PERMEABILITY AND PRODUCTION OF AIR PERMEABLE FILM

(75) Inventors: Young Keun Lee; Young Wook Kim; Tae Joon Kim; Byoung Cheon Jo, all of Taejon (KR)

(73) Assignee: SK Corporation, Seoul (KR)

(*) Notice: Subject to any disclaimer, the term of this patent is extended or adjusted under 35 U.S.C. 154(b) by 0 days.

(21) Appl. No.: 09/429,537

(22) Filed: Oct. 28, 1999

(30) Foreign Application Priority Data

Jul. 23, 1999 (KR) .................................................. 99-3004

(51) Int. Cl.[7] ................................ C08K 3/30; C08K 3/36
(52) U.S. Cl. ........................... 524/423; 524/425; 524/427
(58) Field of Search ..................... 524/423, 424, 524/425, 427, 232

(56) References Cited

U.S. PATENT DOCUMENTS

| | | | |
|---|---|---|---|
| 4,094,854 | * 6/1978 | Harada et al. | 260/42.46 |
| 4,613,643 | * 9/1986 | Nakamura et al. | 524/426 |
| 4,777,073 | 10/1988 | Sheth | 428/155 |
| 4,921,653 | * 5/1990 | Aoyama et al. | 264/41 |
| 5,169,712 | * 12/1992 | Tapp | 428/315.5 |
| 5,252,385 | * 10/1993 | Kagawa et al. | 428/220 |
| 5,308,904 | * 5/1994 | Fujii et al. | 524/232 |
| 6,117,538 | * 9/2000 | Hirata et al. | 428/315.9 |

FOREIGN PATENT DOCUMENTS

| | | | |
|---|---|---|---|
| 232060 | 8/1987 | (EP) | B29C/55/02 |
| 066672 | 12/1982 | (EP) | C08J/5/18 |
| 307116 | 3/1989 | (EP) | C08J/5/18 |
| 459142 | 12/1991 | (EP) | C08L/23/04 |
| 779325 | 6/1997 | (EP) | C08L/5/18 |

* cited by examiner

Primary Examiner—Edward J. Cain
Assistant Examiner—Katarzyna Wyrozebski
(74) Attorney, Agent, or Firm—Abelman, Frayne & Schwab

(57) ABSTRACT

An air-permeable film is prepared by mono-axially drawing a composition comprising a linear low density polyethylene resin having a mw. distribution from 5 to 20, 1 to 100 parts by weight of propylene resin, 1 to 30 parts by weight of an ethylene-propylene copolymer, 1 to 30 parts by weight of a polyolefin resin which has a melt index of 12 or higher, and 50 to 200 parts by weight of an inorganic filler based on 100 parts by weight of total resin by 1.5 to 3 times.

7 Claims, No Drawings

COMPOSITION FOR AIR PERMEABLE FILM OF HIGH PROCESSABILITY AND PERMEABILITY AND PRODUCTION OF AIR PERMEABLE FILM

TECHNICAL FIELD

The present invention relates, in general, to a composition for an air permeable film and, more particularly, to a composition which can be molded into an air-permeable film with superior processability, tensile strength and permeability. Also, the present invention is concerned with a method for producing such a film.

PRIOR ART

Many methods for producing air permeable or porous films are disclosed. Of them, the following process is known as being the most economically favorable and now commercialized: a mixture of a polyolefin resin and an inorganic filler is formed into a film which is then mono- or bi-axially drawn to subject the resin and the filler to interfacial separation, thus forming fine pores.

Prior arts directed to the production of air permeable films taking advantage of inorganic fillers can be found in many patents. For example, European Pat. Laid-Open Publication Nos. 66,672, 307,116, 456,142 and 779,325 (which are referred to as "first patent group" for convenience, hereinafter) disclose third materials, such as aliphatic acids, which are used, along with polyolefin and inorganic fillers, to make film smoother, or compositions with which the unbalance in physical properties between the machine direction and the transverse direction of a film can be solved. Leading to the first patent group, the third additives play an important role in mixing and dispersing a large quantity of inorganic fillers during extrusion and in producing uniform drawn films upon processing. Belonging to a second patent group, European Pat. Laid-Open Publication No. 232,060 discloses an after-treatment process, such as embossing, which can control the mechanical strength of air permeable films while U.S. Pat. No. 4,777,073 teaches a technique for increasing permeability and improving tear strength.

The prior arts of the first patent group are economically unfavorable due to the expensive third additives. In addition, they are poor in the compatibility with polyolefin, giving rise to a decrease in the tensile strength of the films. Further, after films are formed, the additives are released into the surfaces of the films during storage. Pertaining to after-treatment processes by which the physical properties of films can be controlled, the prior arts of the second patent group have a disadvantage of being limited in controlling physical properties of films as compared with the modification of film compositions.

The above conventional techniques paid much attention to additives and after-treatment processes, but not to the resin compositions which form the matrix of the films. The recent tendency has been directed to the productivity improvement of films in order to achieve high-speed film production. However, the compositions now commercially available are poor in processability because calcium carbonate is incorporated at an amount of as much as at least 50% into polyolefin. To obtain desired permeability, calcium carbonate must be incorporated at an amount of more than 55% or the films must be excessively drawn. Therefore, the conventional prior arts find difficulty in overcoming the unbalance in physical properties.

DISCLOSURE OF THE INVENTION

With the background in mind, the present invention has an object of providing a composition for an air-permeable film superior in processability and permeability.

It is another object of the present invention to provide a method for producing an air-permeable film using such a composition.

The present invention is characterized in that a variety of appropriate binder resins are employed to sufficiently express their own advantageous functions and to lower the content of the inorganic filler used. In this regard, a polyethylene resin with a wide molecular distribution is used to ameliorate processability when molding a film. A polypropylene resin is also used to control the softness, machine direction tensile strength, and thermal adhesiveness to propylene non-woven fabrics of a film. With the aim of improving the close adherence to a drawing roll upon drawing the film and of making it easy to conduct the interfacial separation from the inorganic filler, a polyolefin with a high melt index (MI) and an ethylene-propylene copolymer are contained in the composition. In cooperation, these polymers have advantages of assuring high permeability even at a low draw ratio, minimizing the unbalance in physical properties between the machine direction and the transverse direction of the drawn film, improving the tensile strength of the film, and preventing the physical property degradation due to the inorganic filler. Consequently, the air-permeable film is significantly improved in permeability and processability and has balanced physical properties between the machine direction and the transverse direction.

In accordance with one aspect of the present invention, there is provided a composition for an air-permeable film, comprising: 30 to 100 weight parts of a linear, low density polyethylene resin which ranges, in molecular weight distribution, from 5 to 20; 1 to 100 weight parts of a polypropylene resin; 1 to 30 weight parts of an ethylene-propylene copolymer; 1 to 30 weight parts of a polyolefin resin which has a melt index of 12 or higher; and 50 to 200 weight parts of an inorganic filler based on 100 weight parts of the total resins.

In accordance with another aspect of the present invention, there is provided a method for producing an air-permeable film, in which a composition comprising 30 to 100 weight parts of a linear, low density polyethylene resin which ranges, in molecular weight distribution, from 5 to 20, 1 to 100 weight parts of a polypropylene resin, 1 to 30 weight parts of an ethylene-propylene copolymer, 1 to 30 weight parts of a polyolefin resin which has a melt index of 12 or higher, and 50 to 200 weight parts of an inorganic filler based on 100 weight parts of the total resins, is mono-axially drawn by 1.5 to 3 times, whereby the air-permeable film can be provided with superior processability and permeability.

BEST MODES FOR CARRYING OUT THE INVENTION

In the present invention, there is used a linear, low density polyethylene resin which has an MI of 0.5 to 5 g/10 min as measured according to ASTM D 1238, and a density of 0.915 to 0.935 with a molecular weight distribution ranging from 5 to 20. For example, a molecular weight distribution less than 5 causes an extrusion surging phenomenon when producing films at high speeds, making the film thickness poor in uniformity. On the other hand, when the molecular weight distribution exceeds 20, the physical properties of the film are degraded. The linear, low density polyethylene resin is used at an amount of 30 to 100 weight parts when a polypropylene resin is present at an amount of 1 to 100 weight parts, an ethylene-propylene copolymer at an amount of 1 to 30 weight parts, and a polyolefin resin which has a melt index of 12 or higher at an amount of 1 to 30 weight parts. For example, if the linear, low density polyethylene resin is used at an amount less than 30 weight parts, the film is poor in tensile strength and elongation. On the other hand, the use of the linear, low density polyethylene resin at an amount of more than 100 weight parts causes an extrusion surging phenomenon upon high-speed production.

With the aim of controlling the tensile strength and soft physical properties of a film, or ameliorating the thermal adhesiveness to a polypropylene non-woven fabric, a polypropylene resin is used at an amount of 1 to 100 weight parts when the linear, low density polyethylene resin is present at an amount of 30 to 100 weight parts. An amount less than 1 weight part does not show an addition effect. On the other hand, when using the polypropylene resin at an amount more than 100 weight parts, the soft sense of touch is depreciated. The polypropylene resin useful in the present invention has an MI of 1 to 10 and is selected from the group consisting of homo polypropylene, random polypropylene, impact polypropylene, and mixture thereof.

As for the ethylene-propylene copolymer used in the present invention, it functions to complement impact strength, transversely directional strength, and elongation in films as well as to improve the close adherence to a drawing role to give uniform drawing and high permeability. Useful is an ethylene-propylene copolymer which has an ethylene content of 60 to 80% with a Mooney viscosity at 100° C. ranging from 10 to 30 when taking the fluidity of the resin into account. Preferable amounts of the ethylene-propylene copolymer are within the range of 1 to 30 weight parts. For example, an amount less than 1 weight part cannot obtain an addition effect while an amount exceeding 30 weight parts deleteriously affects the thermal resistance of the film.

To attain a film of high permeability, a polyolefin resin which has an MI of 12 g/10 min or greater as measured according to ASTM D 1238, and preferably 20 to 60 g/10 min, is used at an amount of 1 to 30 weight parts when the linear, low density polyethylene is added at an amount of 30 to 100 weight parts. The polyolefin useful in the present invention is selected from the group consisting of low density polyethylene, linear low density polyethylene, high density polyethylene, homo polypropylene, random polypropylene, impact polypropylene, and mixtures thereof.

As an inorganic filler, coated or un-coated calcium carbonate, barium sulfate or mixtures thereof are used. The inorganic filler is used at an amount of 50 to 200 weight parts based on 100 weight parts of the total resins, and preferably 80 to 170 weight parts. For instance, when the amount of the inorganic filler is below 50 weight parts as based on 100 weight parts of the resins, the film has poor permeability. On the other hand, an amount exceeding 200 weight parts brings about a decrease in the physical properties and processability of the film.

When the composition of the present invention is mono-axially drawn by 1.5 to 3 times, a film which is superior in tensile strength and has sufficient permeability can be obtained without being embossed with specific patterns.

A better understanding of the present invention may be obtained in light of the following examples which are set forth to illustrates but are not to be construed to limit the present invention.

COMPARATIVE EXAMPLE I

A linear low density polyethylene for general casting (MI: 3.0, density: 0.919, Mw distribution: 5) was blended with calcium carbonate to give a permeable compound.

Into a twin extruder in which an extrusion temperature was maintained at 190° C. on average, 100 weight parts of the linear low density polyethylene were fed through a main inlet while 100 weight parts of stearic acid-coated calcium carbonate having an average particle size of approximately 1.5 $\mu$m were introduced through a side inlet. They were melt-mixed, extruded and cut into pellets. Using a T-die film unit, the resulting compound was mono-axially drawn by 2 times to produce an air-permeable film 35 g/m$^2$ in balance weight. Its physical properties were measured and are given in Table 1, below.

EXAMPLES I TO III

A linear, low density polyethylene (MI: 3, density: 0.919, Mw distribution: 13) which was made wide in molecular distribution by use of two continuous stirring reactors, a random polypropylene (MI: 5.5, $C_2$ content: 2%), an ethylene-propylene copolymer (Mooney viscosity at 100° C. 24, $C_2$ content: 74%, MI at 230° C.: 3.2), a high density polyethylene (MI: 20, density: 0.961), and an impact polypropylene(MI: 40) were mixed with the aid of a super mixer, as indicated in Table 1, below. Into a twin extruder, the resulting mixture was fed through a main inlet while 100 weight parts of stearic acid-coated calcium carbonate having an average particle size of approximately 1.5 $\mu$m in Examples I and III or 170 weight parts of barium sulfate having an average particle size of approximately 1.5 $\mu$m in Example II were fed through a side inlet, and the materials were melt-mixed, extruded and cut into pellets. Using a T-die film unit, the resulting compound was mono-axially drawn by 2 times to produce an air-permeable film 35 g/m$^2$ in balance weight. Its physical properties were measured and are given in Table 1, below.

TABLE 1

| Materials & Properties | C. Example I | Examples I | II | III |
|---|---|---|---|---|
| LLDPE (MI = 3, d = 0.919, MWD = 5) | 100 | | | |
| LLDPE (MI = 3, d = 0.919, MWD = 13) | | 65 | 65 | 45 |
| Random PP (MI = 5.5, $C_2$ = 2%) | | 20 | 20 | 40 |
| HDPE (MI = 20, d = 0.961) | | 10 | 10 | |
| Impact PP (MI = 40, $C_2$ = 6%) | | | | 10 |
| Ethylene-Propylene copolymer (Mooney viscosity at 100° C. = 24, $C_2$ = 74%, MI at 230° C. = 3.2) | | 5 | 5 | 5 |
| $CaCO_3$ | 100 | 100 | | 100 |
| $BaSO_4$ | | | 170 | |
| Draw Ratio | 2 | 2 | 2 | 2 |
| Film Properties | | | | |
| Max Film Production Speed (m/min) | 35 | 85 | 80 | 75 |
| Permeability (WVTR, g/m$^2$ · 24 hrs) | 5300 | 9900 | 9500 | 9700 |
| Tensile Strength (g) | | | | |
| MD (Machine direction) | 1450 | 1720 | 1750 | 1850 |
| TD (Transverse direction) | 600 | 580 | 560 | 570 |
| Tensile Elong. (%) | | | | |
| MD (Machine direction) | 170 | 160 | 170 | 150 |
| TD (Transverse direction) | 490 | 470 | 480 | 420 |

The physical properties shown in Table 1, were measured as follows:

Maximal Film production Speed: Using a film machine which was used in practice, the maximal film production speed was 5 m/min before a thickness deviation owing to extrusion surging was observed by the naked eye.

permeability: according to ASTM E 96-92, a measurement was made of the change of permeability with weight gain after being stored for a certain period of time under a constant temperature and moisture.

Tensile Strength and Tensile Elongation: according to ASTM D 882, these were measured upon rupture in the machine direction and the transverse direction.

As apparent from the results of the above examples, the compositions for air-permeable films, according to the present invention, can be molded at an improved production speed into films which show high permeability at a low draw ratio, thereby minimizing the unbalance in physical properties between the machine direction and the transverse direction of the film. In addition, with an improvement in tensile strength, the film shows high permeability even at a low content of an inorganic filler, so that it can minimize the physical property degradation due to the inorganic filler.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A composition for an air-permeable film, comprising:
   30 to 100 weight parts of a linear, low density polyethylene resin which ranges, in molecular weight distribution, from 5 to 20;
   1 to 100 weight parts of a polypropylene resin;
   1 to 30 weight parts of an ethylene-propylene copolymer;
   1 to 30 weight parts of a polyolefin resin which has a melt index of 12 or higher; and
   50 to 200 weight parts of an inorganic filler based on 100 weight parts of the total resins.

2. The composition as set forth in claim 1, wherein the linear, low density polyethylene resin has an melt index of 0.5 to 5 and a density of 0.915 to 0.935.

3. The composition as set forth in claim 1, wherein the polypropylene resin has a melt index of 1 to 10 and is selected from the group consisting of homo polypropylene, random polypropylene, impact polypropylene, and mixtures thereof.

4. The composition as set forth in claim 1, wherein the ethylene-propylene copolymer has an ethylene content of 60 to 80% and a Mooney viscosity of 15 to 30 at 100° C.

5. The composition as set forth in claim 1, wherein the polyolefin resin is selected from the group consisting of low density polyethylene, linear low density polyethylene, high density polyethylene, homo polypropylene, random polypropylene, impact polypropylene, and mixtures thereof.

6. The composition as set forth in claim 1, wherein the inorganic filler is selected from the group consisting of coated calcium carbonate, uncoated calcium carbonate, coated barium sulfate, uncoated barium sulfate, and a mixture thereof.

7. A method for producing an air-permeable film, in which a composition comprising 30 to 100 weight parts of a linear low density polyethylene resin which ranges, in molecular weight distribution from 5 to 20, 1 to 100 weight parts of a polypropylene resin, 1 to 30 weight parts of an ethylene-propylene copolymer, 1 to 30 weight parts of a polyolefin resin which has a melt index of 12 or higher, and 50 to 200 weight parts of an inorganic filler based on 100 weight parts of the total resins, is mono-axially drawn by 1.5 to 3 times, whereby the air-permeable film can be provided with superior processability and permeability.

* * * * *